Aug. 25, 1964     H. SCHWINGER     3,145,907
BAGS
Original Filed March 19, 1958
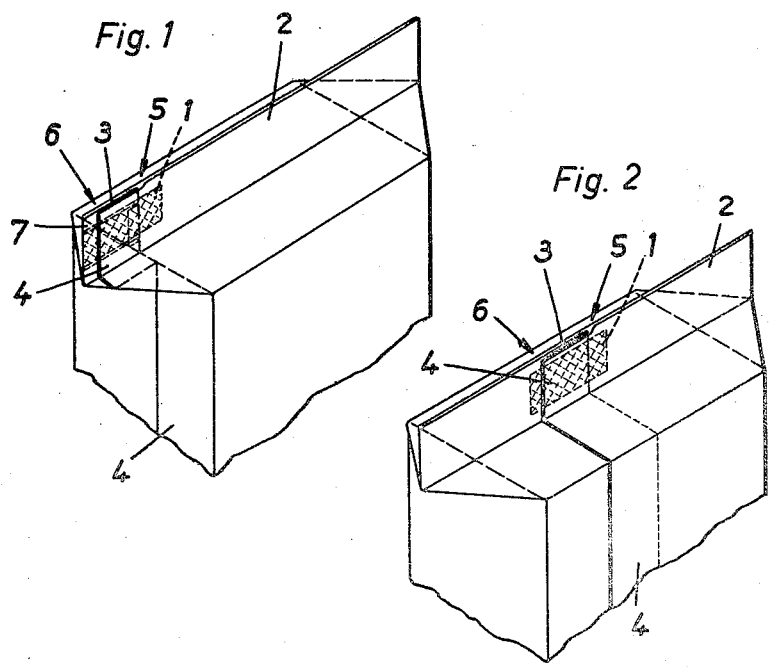
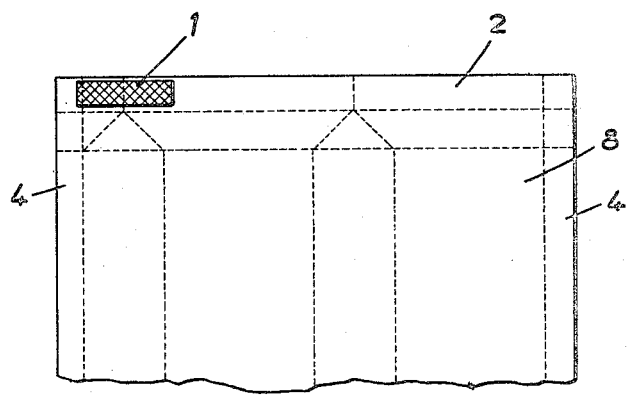
INVENTOR:
HEINRICH SCHWINGER United States Patent Office 3,145,907
Patented Aug. 25, 1964

3,145,907
BAGS
Heinrich Schwinger, Fellbach, Germany, assignor to Firma Fr. Hesser Maschinenfabrik-Aktiengesellschaft, Stuttgart-Bad Cannstatt, Germany, a corporation of Germany
Original application Mar. 19, 1958, Ser. No. 722,442. Divided and this application Mar. 21, 1961, Ser. No. 108,689
Claims priority, application, Germany, Mar. 23, 1957, H 29,690
2 Claims. (Cl. 229—53)

The invention relates to bags formed of heat sealable sheet materials with closed seams, and in which a longitudinal seam of the bag crosses top and/or bottom seams of the same. The invention is concerned with both adhesion or cementing using a material which is plastic and tacky when heated, and capable of adhering to a compatible surface on cooling (e.g. uniting two such surfaces), and heat sealing in the more conventional sense of welding two plasticised layers or foils together. These will all be hereinafter generically referred to under the term "heat sealing."

This application is a division of my copending application Serial No. 722,442, filed March 19, 1958, now abandoned.

Heat sealed bags of all kinds in which the bottom, longitudinal, and top seams are not uniplanar, that is to say which do not furnish a continuous seam, are liable to develop unsealed parts in the top and bottom seams at those places where the bottom and/or top seam intersects or intersect the longitudinal seam of the bag. These unsealed parts form channels of varying degrees of fineness. These are attributable to the fact that, in contrast to the remaining parts of the seams in question where only two layers of the bag material are superimposed, at an intersection of this character there is a lamination consisting of three or more layers which forms a step. During the heat sealing of the seams there is a zone, albeit narrow, at the step where no pressure, or only a limited pressure, is applied by the heated pressing jaws, and the walls of the bag are left unjoined or are only defectively united at the zone concerned. The heat sealable layer of the bag material present at these places is mostly so thin as to be insufficient to close the aforesaid channels merely by overflow when softened during the heating.

This defect is particularly evident in seams disposed externally of the bag walls (see FIGURE 1 of the enclosed drawing), and where inside is cemented against inside both in the base of the longitudinal seam and of the bottom and top seams. This is frequently the case in bag packages made of packaging materials which are provided with a coating on one side only, or of foils. In bags of this character four layers of the material of the bags are superimposed at the points of intersection.

In pursuance of the object of eliminating this drawback, according to the present invention an additional layer of a heat sealing material or the like adequately covering the area of intersection is coated on the inside of the top and/or bottom seam transversely across the zone at which the same will later intersect with the longitudinal seam, before the top and/or bottom seam is actually formed and heat sealed.

In a preferred embodiment of this method the additional heat sealing layer is applied in the form of a strip on the inside of the top and/or bottom seam located opposite the longitudinal seam. It can be applied directly to the blank which is to be used for fabricating the bag, or immediately before the heat sealing of the bottom and/or top seam. The additional heat sealing layer may even be applied to the web of material which is to be blanked out to form the bags.

The aforementioned fine channels formed at the steps in the seam at the zones of intersection during the heat sealing are sealed by the additionally applied heat sealing layer, since an adequate quantity of plastic cement for the heat sealing is then sited at the appropriate places.

Two embodiments of the invention will now be described with reference to the accompanying diagrammatic drawings, in which:

FIGURE 1 illustrates a bag of heat sealable material with cemented seams disposed at the exterior of the bag walls and with a longitudinal seam located along the margin of a narrow side of the bag.

FIGURE 2 illustrates a bag in which the longitudinal seam extends along the middle of a wide side of the bag.

FIGURE 3 illustrates part of a blank for the formation of the bag illustrated in FIGURE 1.

In the examples shown in the drawings, the separate additional heat sealing layer in accordance with the present invention is preferably applied in the form of a strip 1 to the inner sides of the bottom and/or top seam of the bag (the top seam 2 being chosen for purposes of illustration) to the bag blank, or to the parent web of material for forming the bag, in such a way that each strip covers a zone 3 at which the seam 2 and the longitudinal seam 4 intersect and overlap. This additional layer 1 affords, during the heat sealing of the bottom or top seam concerned, sufficient plastic cement at the zone 3 to completely fill all gaps or channels which might be formed at the step 5 in the seam, thereby sealing these off.

It is preferred, moreover, to make the additional layer 1 of a length such that it also covers the zone of the step 6 in the longitudinal seam, since here also there is a zone at which smaller pressure is applied during heat sealing of the seam 2, which could result in the seam having unsealed parts. This applies particularly to the type of bag illustrated in FIGURE 1, in which the longitudinal seam 4 is located at the margin of one narrow side of the bag. In this type of bag a tab 7 of variable width is formed beside the longitudinal seam 4, and this likewise only partially receives the pressure of the heating tools during the sealing. To ensure that a complete and proper seal is also produced at this part, the layer 1 of cement may be extended to the opposite side of the bottom or top seal 2 concerned and, if desired, even into the longitudinal seam 4, as illustrated in FIGURE 1. Thus there is a double additional layer of cement at the weak points, and even under the most unfavourable conditions these will produce a completely sealed seam.

The additional layer of cement 1, the formation of which is primarily dependent on the qualities of the inner side of the bag and the contents thereof, may be applied directly to the bag blank 8 (FIGURE 3) or during a convenient stage in the manufacture of the bag; it will be evident that this application may instead be carried out on the web of material which is fed to the bag fabricating machine.

The invention is eminently suitable for bags in which, as illustrated in the drawings, all the seams are formed by cementing together the inner sides of the bag material. It is, however, also suitable for employment with bags of different kinds, in which for example only the top and/or bottom seam is or are formed in this way whilst, in the case of the longitudinal seam, the inside is cemented to the outside of the bag.

What we claim then is:
1. A bag formed from a sheet of heat sealable material, said bag having an adherent face-to-face longitudinal side seam and an adherent face-to-face transverse end closure seam intersecting the longitudinal side seam at one end of the bag, facing portions of the sheet at the intersection of the seams defining a narrow channel, and a thermoplastic meltable sealing strip extending across the intersection of the seams, said strip being disposed between and in sealing engagement with facing portions of the sheet, said strip comprising a filling portion which, upon heating, will at least partially fill and completely close said channel.

2. A bag formed of generally rectangular heat sealable sheet material folded to form a tubular body, opposite lateral edges of said sheet material being overlapped, adhesive means securing said edges together to form a longitudinal seam of said body, marginal portions of one end of said sheet being juxtaposed, further adhesive means securing said marginal portions together to form a transverse seam at one end of said body perpendicular to and intersecting the longitudinal seam at one end of the longitudinal seam, the intersecting seams at said one end of the body being formed by overlapping portions of sheet material defining a narrow longitudinally extending channel opening into said body, and a supplemental thermoplastic meltable sealing strip extending transversely of and beyond the overlapped edges of the sheet material at the intersection of the longitudinal and transverse seams, said strip comprising a solid meltable portion which, upon heating, flows to close said channel completely.

References Cited in the file of this patent

UNITED STATES PATENTS

| | | |
|---|---|---|
| 1,983,291 | Haskell | Dec. 4, 1934 |
| 2,176,584 | Daller | Oct. 17, 1939 |
| 2,274,934 | Piazza | Mar. 3, 1942 |

FOREIGN PATENTS

| | | |
|---|---|---|
| 481,105 | Canada | Feb. 12, 1952 |
| 567,484 | Great Britain | Feb. 15, 1945 |